United States Patent [19]

Cory

[11] Patent Number: 4,673,135
[45] Date of Patent: Jun. 16, 1987

[54] FRUIT SHREDDING APPARATUS

[76] Inventor: Charles E. Cory, 5215 Vine Hill Rd., Sebastopol, Calif. 95472

[21] Appl. No.: 757,390

[22] Filed: Jul. 22, 1985

[51] Int. Cl.$^4$ ................ B02C 18/30; B02C 18/36
[52] U.S. Cl. .................. 241/82.1; 241/92; 241/273.2
[58] Field of Search .............. 241/28, 82.1, 82.2, 241/83, 84, 85, 92, 86, 101.7, 247, 273.1, 273.2, 280, 186 A

[56] References Cited

U.S. PATENT DOCUMENTS

| 754,249 | 3/1902 | Snow et al. |
| 1,373,398 | 4/1921 | Babcock . |
| 2,218,119 | 9/1939 | McAllister . |
| 2,711,964 | 6/1955 | Wiemer ...................... 241/186 A |
| 2,898,052 | 8/1959 | Kautz . |
| 3,083,634 | 4/1963 | Rietz . |
| 3,495,640 | 2/1970 | Gluckstein et al. |
| 3,892,365 | 7/1975 | Verdun . |
| 3,985,304 | 10/1976 | Sontheimer ...................... 241/92 |
| 4,145,453 | 3/1979 | Lenhardt, Sr. . |

Primary Examiner—Timothy V. Eley
Attorney, Agent, or Firm—Malcolm B. Wittenberg

[57] ABSTRACT

A fruit shredding apparatus comprises fruit shredding means for shredding fruits, and fruit conveying and pressing means for conveying and pressing the fruits toward the fruit shredding means. The fruit shredding means in turn comprises a generally planar cutting disc that has a plurality of cutting holes for shredding the fruits into a plurality of elongated strings so as to enhance the production of fruit juice.

13 Claims, 7 Drawing Figures

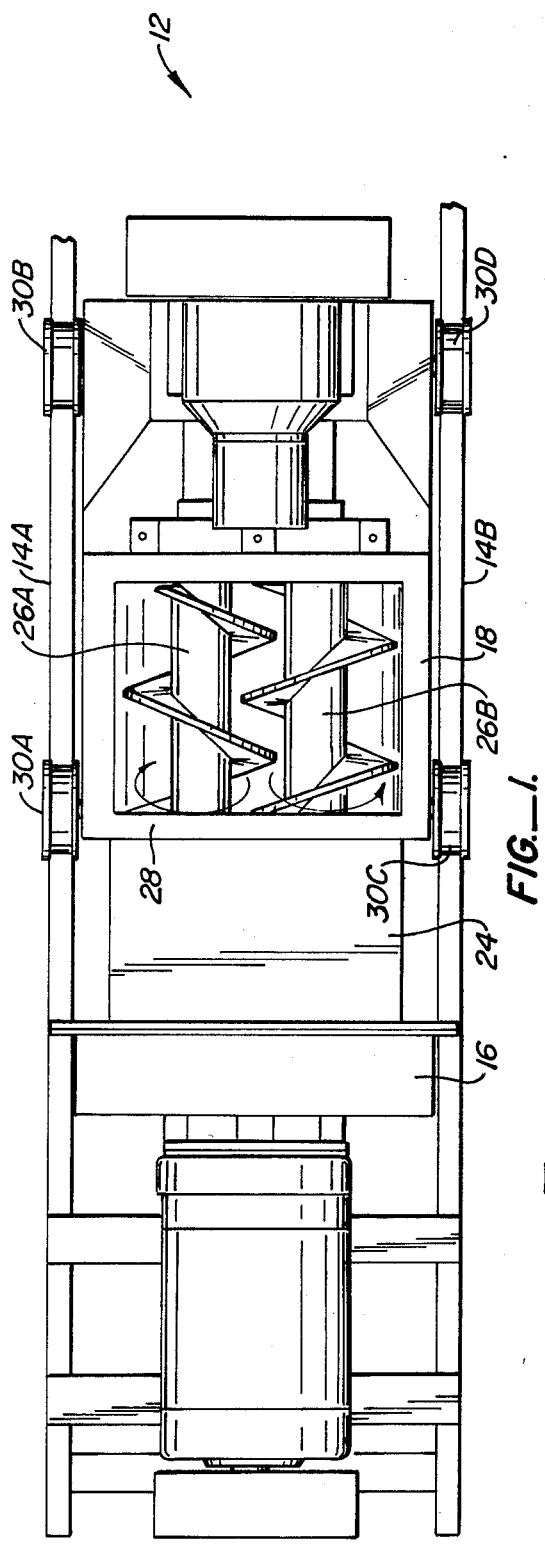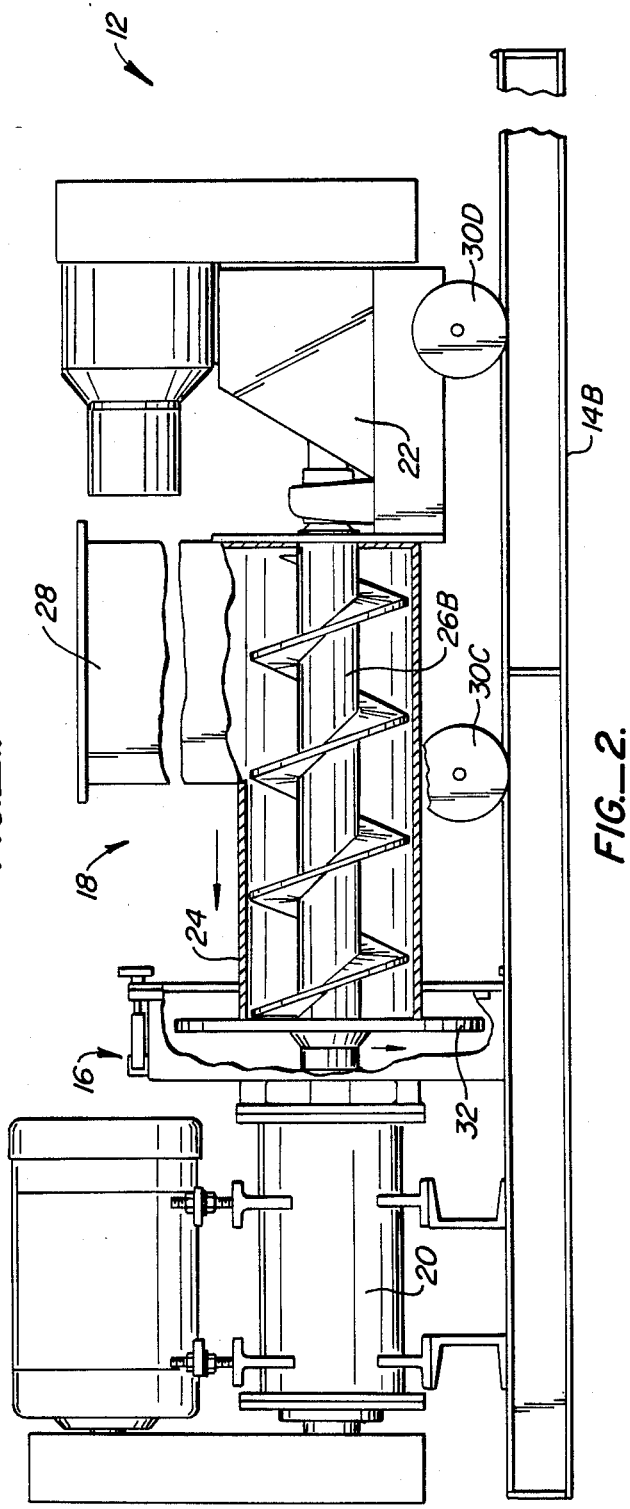

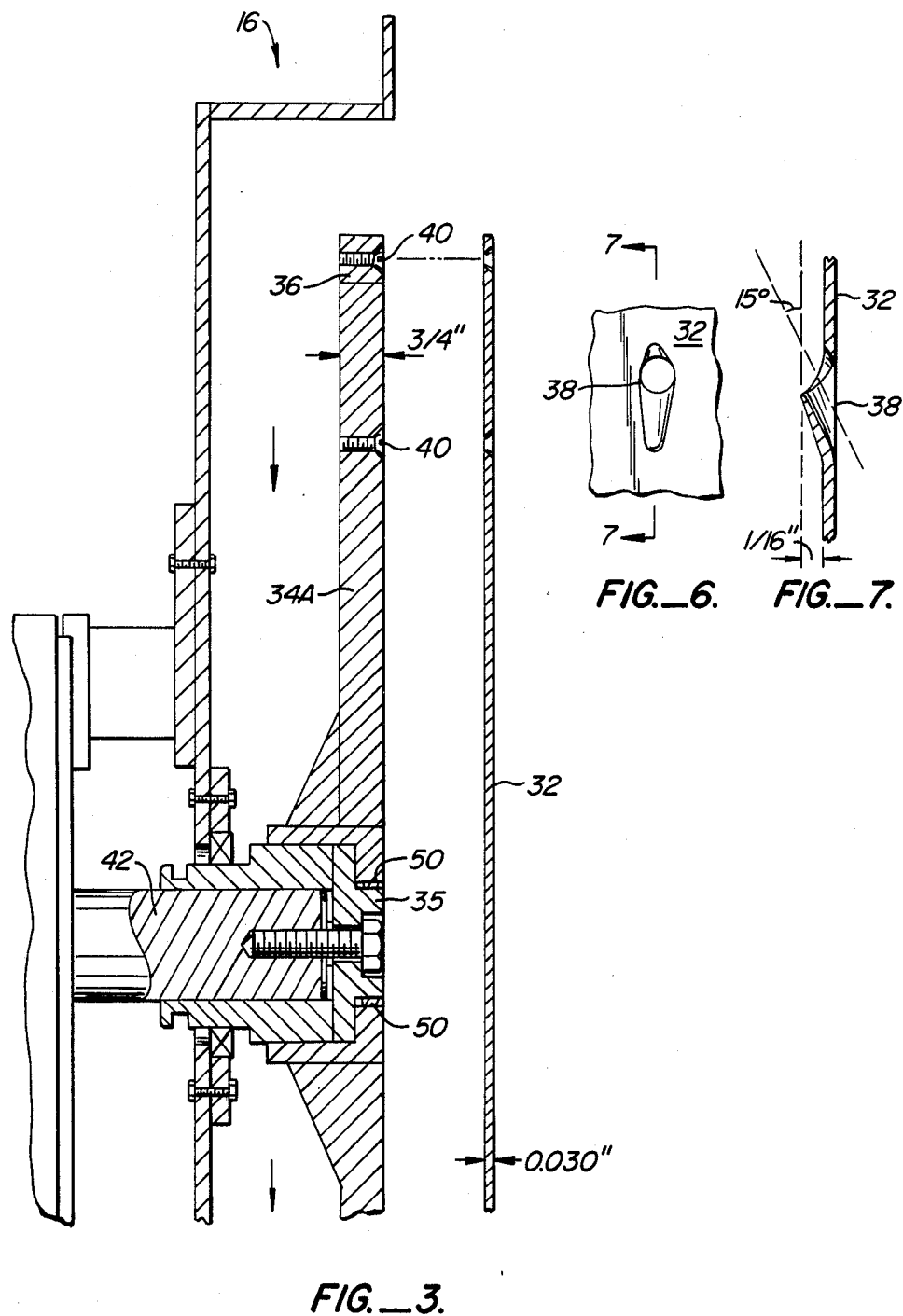

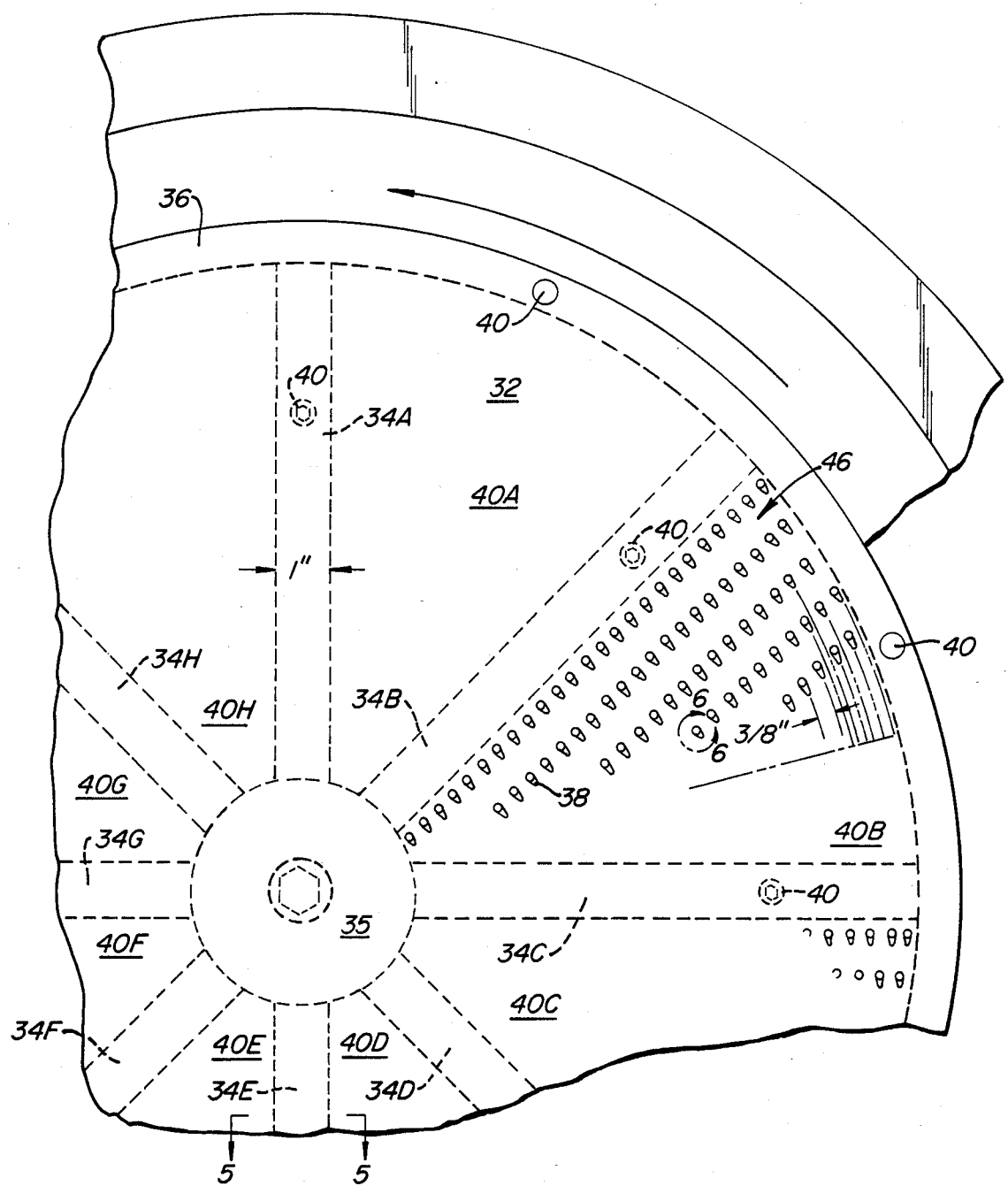
FIG._4.
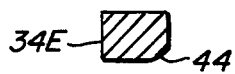
FIG._5.

FRUIT SHREDDING APPARATUS

DESCRIPTION

1. Technical Field

This invention relates to food processing apparatus, and more particularly to a fruit shredding apparatus.

2. Background Art

Fruit processing apparatus, especially those used in producing fruit juices, are common in the art. In producing fruit juice, the harvested fruit must first be comminuted in some fashion such that juice may be readily squeezed from the comminuted fruit particles. To produce juice from apples, the comminution by prior art apparatus generally results in spherical particles ranging from 0.01 inch to 0.25 inch. These particles are generally referred to as "mash." The next step in prior art techniques is to press the mash against a filter cloth or screen such that juice is separated from the solids. If the particles are too small or too fine, they tend to plug small holes or passageways in the filter element of the crushing apparatus, severely limiting the flow rate of the resultant juice. In addition, a mash consisting of fine particles also tend to seal itself and lock in the liquid. For example, if the mash between the pressing element of an apparatus is several inches in thickness, the outer surfaces of the mash may become relatively dry while the interior of the mash is still quite wet due to the closing off of the passageways. On the other hand, if the apples are chopped into larger pieces, e.g., one-quarter inch to one-half inch, not enough juice will be produced since not enough juice cells have been cut. Theoretically, over 200 gallons of juice should be produced for each ton of apples processed. In practice, prior art apparatus can yield only approximately 160 gallons per ton.

In addition to the inefficiency of these prior art apparatus, prior art apparatus generally also require a catalytic material for enhancing the production of juice. This material, generally referred to as "press-aid," is a bulky or fibrous material that is added to the mash in order to provide liquid flow passageways within the mash. The most common "press-aid" is rice hulls, shredded paper, or wood bark. The "press-aid" generally adds approximately four to eight percent by weight to the mash. The use of press-aid results in three disadvantages —it is generally expensive, e.g., a large fruit juice manufacturer may spend over a million dollars per season for press-aid; it detracts from the original flavor of the juice; and it absorbs a small quantity of the juice.

A further disadvantage of prior art apparatus is that a substantial portion of the comminuted particles may pass through a press filter and into the juice, requiring another filtering step to filter out the particules. In general, the juice manufactured by prior art apparatus contains fruit solids in the range of three to ten percent.

DISCLOSURE OF THE INVENTION

In view of the prior art, it is a major object of the present invention to provide a fruit shredding apparatus that is capable of enhancing greater fruit juice productivity.

It is another object of the present invention to provide a fruit shredding apparatus that does not require the use of juice enhancing material.

It is a further object of the present invention to provide a fruit shredding apparatus that minimizes the presence of fruit particles in the juice.

In order to accomplish the above and still further objects, the present invention provides a fruit shredding apparatus that comprises fruit shredding means for shredding fruits, and fruit conveying and pressing means for conveying and pressing the fruits toward the fruit shredding means. The fruit shredding means in turn comprises a generally planar cutting disc that has a plurality of cutting holes for shredding the fruits into a plurality of elongated strings so as to enhance the production of fruit juice.

Other objects, features, and advantages of the present invention will appear from the following detailed description of the best mode of a preferred embodiment, taken together with the accompanying drawings.

BRIEF DESCRIPTION OF THE DRAWINGS

FIG. 1 is a top view of a fruit shredding apparatus of the present invention;

FIG. 2 is a side view of the fruit shredding apparatus of FIG. 1, partially broken away;

FIG. 3 is an enlarged, partial cross section view of the fruit shredding means of the fruit shredding apparatus of FIG. 2;

FIG. 4 is an enlarged, partial front view of a fruit shredding disc of the fruit shredding means of FIG. 3;

FIG. 5 is an enlarged, cross section view of a spoke of the fruit shredding means of FIG. 3;

FIG. 6 is an enlarged, front view of a shredding hole of the fruit shredding disc of FIG. 4; and FIG. 7 is an enlarged, cross section view of the shredding hole of FIG. 6.

BEST MODE FOR CARRYING OUT THE INVENTION

Referring to FIGS. 1 and 2, there is shown a fruit shredding apparatus, generally designated 12. Fruit shredding apparatus 12 comprises a pair of parallel rail members 14A and 14B, rotatable fruit shredding means 16 mounted on rails 14A and 14B, and fruit conveying and pressing means 18 rollably mounted on rails 14A and 14B. In addition, fruit shredding apparatus 12 also comprises fruit shredding motor means 20 and fruit conveying motor means 22.

More particularly, fruit conveying and pressing means 18 includes a generally cylindrical member 24 that contains two parallel, longitudinally-extending helical screws 26A and 26B, and a fruit intake bin 28. Helical screws 26A and 26B are driven by fruit conveying motor means 22, which is a conventional variable speed hydraulic motor in the preferred embodiment. Moreover, fruit conveying and pressing means 18 and fruit conveying motor 22 are structurally coupled together such that they are rollably mounted on rails 14A and 14B via a plurality of wheels 30A–30D.

Fruit shredding means 16 comprises a rotatably mounted cutting disc 32 that is being driven by fruit shredding motor means 20. Fruit shredding motor means 20 in the preferred embodiment is a conventional variable speed hydraulic motor. Fruit shredding motor 20 may also be a direct-current (DC) motor. As best shown in FIGS. 3 and 4, cutting disc 32 is mounted on a plurality of radially extending spokes 34A–34H and a circular rim 36. As best shown in FIGS. 3–5, each of the spokes 34A–34H has a width of approximately one inch and a thickness of approximately ¾ inch. In addition, the a front corner 44 of each spoke, the corner in the direction of disc rotation, is rounded. Conventional fastening means such as screws 40 may be used to mount cutting disc 32 onto spokes 34A-34H and rim 36. The inner ends of spokes 34A-34H are mounted on a hub 35 which in turn is rotatably mounted onto a rotatable driving shaft 42 of fruit shredding motor 20, as best shown in FIG. 3.

As best shown in FIG. 4, cutting disc 32 includes a plurality of shredding holes 38. In the preferred embodiment, cutting disc 32 has a thickness in the range of approximately 0.020 to 0.060 inch, with 0.030 inch as the preferred thickness. Shredding holes 38 are positioned on cutting disc 32 in the manner as illustrated in FIG. 4. Using spokes 34A-34H as delineations, cutting disc 32 is divided into eight cutting zones 40A-40H. In each cutting zone, e.g., zone 40B, a row of shredding holes 38 is positioned adjacent spoke 34B in a linear fashion, filling substantially the entire space of zone 40B from rim 36 to hub 35. The next row of shredding holes 38, however, has a reduced number of shredding holes 38. In this fashion, five rows of shredding holes 38 are provided for each cutting zone such that each successive row has a lesser number of shredding holes 38 than the previous. Shredding holes 38 occupy approximately one half of the area of each cutting zone. As best illustrated in FIGS. 6 and 7, each shredding hole 38 has a diameter in the range of approximately 3/32 to ¼ inch, with ⅛ inch the preferred diameter, and is positioned at an angle ten to 30 degrees from the surface of cutting disc 32, with 15 degrees the preferred angle. In addition, as best shown in FIG. 4, the distance between two holes 38 is approximately three to four times the diameter of each hole 38, resulting in ⅜ inch as the preferred distance.

In operation, apples are first placed into intake bin 28, as best shown in FIGS. 1 and 2. The pair of helical screws 26A and 26B then convey the apples toward cutting disc 32. Screws 26A and 26B are configured to intermesh and rotate in a direction outward and downward from the center of fruit conveying member 24, as best shown in FIG. 1. The use of two screws is to prevent the common problem of "cylindering" that occurs when using one screw. Cylindering is the phenomenon where, due to either too many apples or the presence of an obstruction, apples tend to congregate near the axle of the single screw. With two screws, however, apples are prevented from cylindering when they encounter each other at the central intermeshing area, forcing them into cutting disc 32. In addition, the speed of rotation of screws 26A and 26B is selected to be greater than that of cutting disc 32 so that the apples in relation to cutting disc 32 are essentially stationary. This permits a consistent and proper shredding of the apples rather than a merely chipping away of tumbling apples. Cutting disc 32 is capable of rotating in the range of approximately 600-1000 revolutions per minute (rpm). The selection of these speeds is well within the knowledge of one skilled in the art.

To compensate for the varying crispness and softness of apples harvested at different times of the year and for the varying amount of apples in conveying means 18, variable speed conveying motor 22 is provided to permit a consistent cutting of the apples. The capability to alter the speed of rotation is an inherent characteristic of a hydraulic motor. Hydraulic motor 22 of the preferred embodiment is capable of controlling the speed and torque of screws 26A and 26B. Variable speed motor 22 is torque responsive in that it is capable of self regulating its speed in light of the condition of the apples so as to maintain sufficient pressure on the apples. Sufficient pressure in turn ensures consistent cutting of the apples. The characteristic and operation of a hydraulic motor are also well within the knowledge of one skilled in the art.

As apples are forced into cutting disc 32, which is rotating in a counterclockwise direction, apples are shredded by shredding holes 38. The resultant noodle-like strings of apples have diameters or cross sections of a range approximately 1/16 to 3/16 inch and lengths of a range approximately ½ inch to three inches. During the shredding of apples, every three rows of shredding holes 38 would slice off approximately one layer of an apple. In addition, each row of holes 38 is configured that after each row has sliced off approximately one third of a layer, the force exerted by screws 26A and 26B immediately forces that just-shredded face of the apple onto the flat strip 46 of cutting disc 32 that immediately precedes the next row of holes 38, as best shown in FIG. 4. Moreover, holes 38 of the first row are not aligned with their counterparts of the second row. Rather, they are spaced slightly off alignment such that three successive rows of holes 38 would slice off one layer of an apple.

To prevent damage to the strings of apples as they exit holes 38, the forward exposed edge 44 of each of the spokes 34A-34H is beveled to a rounded corner. This configuration permits the strings of apple to miss the spokes 34A-34H. The strings of apples then fall into a receptacle, not shown, for conveying to a pressing apparatus, also not shown.

The particular configuration of the shredded apples, noodle-like strings, permits a yield of approximately 190 gallons of juice for each ton of apples. This is due to the fact that the exposed surface area, i.e., the amount of cut juice cells, is greater for this configuration as compared to the configurations produced by prior art fruit shredding apparatus. In addition, greater juice yield is also the result of the intermeshing of these strings in that the mash has more inherent liquid passageways for better draining of the juice. Thus, press-aids are eliminated during the pressing of these strings, preserving the flavor of the juice and permitting the production of more juice. Moreover, additional filtering is not needed since the strings are of a sufficient size that they do not seep through the filter.

Fruit shredding apparatus 12 also includes a rapid and easy cleaning feature. As best shown in FIG. 3, cutting spokes 34A-34H are mounted onto hub 35 by utilizing right-handed threads 50 such that cutting disc 32, as attached to spokes 34A-34H, is also mounted. Spokes 34A-34H are mounted onto hub 35 by turning them in a clockwise direction. In addition, the counterclockwise rotation of spokes 34A-34H during shredding operation prevents them from disengaging hub 35. To remove disc 32 and spokes 34A-34H for cleaning, a conventional tool is first used to restraint driving shaft 42 from rotating, and spokes 34A-34H and disc 32 are removed by sharply turning them counterclockwise so as to disengage threads 50. With disc 32 removed, fruit conveying and pressing means 18 is then rolled away from fruit shredding means 16 so as to permit cleaning and maintenance of other internal components.

It will be apparent to those skilled in the art that various modifications may be made within the spirit of the invention and the scope of the appended claims. In addition, some aspects of fruit shredding apparatus 12 are not explicitly described in that one skilled in the art would naturally be aware of their use. For example, fruit conveying and pressing means 18 and fruit shredding means 16 are aligned so as to enhance their performance. And, means 16 and means 18 are locked together during operation in order to maintain a stationary, stable fruit shredding configuration.

I claim:

1. A fruit shredding apparatus, comprising
 fruit shredding means for shredding fruits, said fruit shredding means comprises
  a drive shaft,
  fruit shredding motor means rotatably connected to said drive shaft, and
  a generally planar cutting disc rotatably mounted to said drive shaft, wherein said cutting disc is configured into a plurality of generally similar zones, and further wherein each of said zones has a plurality of cutting holes for shredding said fruits into a plurality of elongated strings, said cutting holes being arranged into a plurality of rows which occupy approximately one half of each of said zones, with each of said rows within each of said zones containing a number of said cutting holes such that said cutting holes of one of said rows are positioned in a staggered fashion with respect to said cutting holes of an adjacent one of said rows and the number of said cutting holes for each of said rows is different from the number of said cutting holes for said adjacent one of said rows; and
 fruit conveying and pressing means for conveying and pressing said fruits toward said fruit shredding means, said fruit conveying and pressing means comprises
  two parallel, longitudinally extending helical screws for conveying and pressing said fruits toward said cutting disc, wherein said helical screws are positioned in an intermeshing configuration for projecting a positive pressure on said fruits so as to efficaciously convey and press said fruits toward said cutting disc, and
  fruit conveying motor means for driving said helical screws, wherein said fruit conveying motor means is a variable speed conveying motor for maintaining sufficient pressure on said fruits so as to ensure a consistent cutting of said fruits.

2. The fruit shredding apparatus as claimed in claim 1, wherein said generally planar cutting disc defines a generally planar surface, and further wherein each of said cutting holes is configured to have an axis that is positioned at an angle to said planar surface of said cutting disc, said angle ranging from 10 to 30 degrees.

3. The fruit shredding apparatus as claimed in claim 2, wherein each of said cutting holes has a diameter ranging from 3/32 inch to ¼ inch.

4. The fruit shredding apparatus as claimed in claim 1, wherein said helical screws generate torque, and further wherein said variable speed motor varies its speed of rotation in response to the torque of said helical screws.

5. The fruit shredding apparatus as claimed in claim 1, wherein said fruit conveying and pressing means is rollably mounted on wheels.

6. The fruit shredding apparatus as claimed in claim 1, wherein said disc includes readily-disengaging means for easy mounting and dismounting of said disc.

7. The fruit shredding apparatus as claimed in claim 6, wherein said readily-disengaging means is a hub.

8. A fruit shredding apparatus, comprising
 fruit shredding means for shredding fruits, said fruit shredding means comprises
  a drive shaft,
  fruit shredding motor means rotatably connected to said drive shaft, and
  a generally planar cutting disc rotatably mounted to said drive shaft, wherein said cutting disc is configured into a plurality of generally similar zones, and further wherein each of said zones has a plurality of cutting holes for shredding said fruits into a plurality of elongated strings, said cutting holes being arranged into a plurality of rows which occupy approximately one half of each of said zones, with each of said rows within each of said zones containing a number of said cutting holes such that said cutting holes of one of said rows are poisitioned in a staggered fashion with respect to said cutting holes of an adjacent one of said rows and the number of said cutting holes for each of said rows is different from the number of said cutting holes for said adjacent one of said rows; and
 fruit conveying and pressing means for conveying and pressing said fruits toward said fruit shredding means, said fruit conveying and pressing means comprises
  two parallel, longitudinally extending helical screws for conveying and pressing said fruits toward said cutting disc, wherein said helical screws are positioned in an intermeshing configuration for projecting a positive pressure on said fruits so as to efficaciously convey and press said fruits toward said cutting disc, and
  fruit conveying motor means for driving said helical screws, wherein said fruit conveying motor means is a variable speed conveying motor that varies its speed of rotation in response to torque generated by said helical screws so as to maintain sufficient pressure on said fruits in order to ensure a consistent cutting of said fruits.

9. The fruit shredding apparatus as claimed in claim 8, wherein said generally planar cutting disc defines a generally planar surface, and further wherein each of said cutting holes is configured to have an axis that is positioned at an angle to said planar surface of said cutting disc, said angle ranging from 10 to 30 degrees.

10. The fruit shredding apparatus as claimed in claim 9, wherein each of said cutting holes has a diameter ranging from 3/32 inch to ¼ inch.

11. The fruit shredding apparatus as claimed in claim 10, wherein said disc includes readily-disengaging means for easy mounting and dismounting of said disc.

12. The fruit shredding apparatus as claimed in claim 11, wherein said readily-disengaging means is a hub.

13. The fruit shredding apparatus as claimed in claim 12, wherein said fruit conveying and pressing means is rollably mounted on wheels.

* * * * *